US008885484B2

(12) United States Patent
Birajdar et al.

(10) Patent No.: US 8,885,484 B2
(45) Date of Patent: Nov. 11, 2014

(54) BOOTSTRAPPING FAULT DETECTION SESSIONS OVER A P2MP TUNNEL

(75) Inventors: Girish Birajdar, Fremont, CA (US); Jayant Kotalwar, Cupertino, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 335 days.

(21) Appl. No.: 13/189,872

(22) Filed: Jul. 25, 2011

(65) Prior Publication Data
US 2013/0028099 A1 Jan. 31, 2013

(51) Int. Cl.
G01R 31/08 (2006.01)
H04L 12/703 (2013.01)
H04L 12/46 (2006.01)
H04L 12/715 (2013.01)
H04L 12/26 (2006.01)
H04L 12/24 (2006.01)
H04L 12/723 (2013.01)

(52) U.S. Cl.
CPC .................. H04L 45/28 (2013.01); *H04L 45/04* (2013.01); *H04L 43/10* (2013.01); *H04L 41/04* (2013.01); *H04L 45/50* (2013.01); H04L 12/4641 (2013.01)
USPC .......................................... 370/242; 370/248

(58) Field of Classification Search
USPC .......................................................... 370/242
See application file for complete search history.

(56) References Cited

U.S. PATENT DOCUMENTS

| | | | |
|---|---|---|---|
| 8,532,124 B2 * | 9/2013 | Satterlee et al. ............... | 370/401 |
| 2007/0047556 A1 * | 3/2007 | Raahemi et al. ......... | 370/395.53 |
| 2008/0080507 A1 * | 4/2008 | Swallow et al. .............. | 370/392 |
| 2008/0195733 A1 * | 8/2008 | Detienne et al. .............. | 709/224 |
| 2009/0010153 A1 * | 1/2009 | Filsfils et al. .................. | 370/218 |
| 2009/0086644 A1 * | 4/2009 | Kompella et al. ............. | 370/248 |
| 2009/0238084 A1 * | 9/2009 | Nadeau et al. ................ | 370/248 |
| 2009/0265553 A1 * | 10/2009 | Balissat et al. ................ | 713/168 |

OTHER PUBLICATIONS

The International Search Report and The Written Opinion of The International Searching Authority, or The Declaration in PCT/US2012/046082, mailed Oct. 11, 2012, Alcatel-Lucent USA Inc., Applicant, 8 pages.

* cited by examiner

*Primary Examiner* — Gerald Smarth
(74) *Attorney, Agent, or Firm* — Wall & Tong LLP

(57) ABSTRACT

A method for detecting faults associated with a tunnel delivering multicast traffic from a source provider edge router (PE) to each of a plurality of destination PEs, the method using a routing protocol such as BGP to communicate route information to destination PEs, and a fault detection protocol such as BFD to detect tunnel faults.

20 Claims, 5 Drawing Sheets

BOOTSTRAPPING FAULT DETECTION SESSIONS OVER A P2MP TUNNEL

FIELD OF THE INVENTION

The invention relates to the field of communication networks and, more specifically, to fault detection such as connectivity fault detection within the context of secure tunnels.

BACKGROUND

A Virtual Private Network (VPN) provides secure connectivity over public or private networks between, illustratively, two or more customer edge (CE) routers or sites located at different physical locations. A Multicast VPN may be used to transport multicast traffic between multiple CE routers.

A Multicast Distribution Tree (MDT) is used to connect a source or transmitter CE router to all destination or receiver CE routers. The source or transmitter CE router forms a root node of the MDT, while the destination or receiver CE routers form leaf nodes of the MDT.

One way of creating an MDT is by using a Point to Multi-Point (P2MP) tunnel when an underlying network transport layer is based on a Multi-Protocol Label Switched (MPLS) network. The ingress or source Label Switch Router (LSR) forms the root node of the multicast distribution tree (MDT), while the egress or destination LSR(s) form the leaf nodes of the MDT. The leaf nodes can join and leave the MDT at any time. It is noted that the MDT is unidirectional; packets travel only from the root to the leaves.

For reliable traffic delivery over the Internet, it is important to reduce delay due to connectivity failure. Bidirectional Forwarding Detection (BFD) provides a mechanism to quickly detect connectivity failure so that an alternate connectivity path can be used to restore communication. To detect a data plane failure in the forwarding path of an MPLS LSP, a BFD session is established for that MPLS LSP. If the LSP is associated with multiple Forwarding Equivalence Classes (FECs), a BFD session is established for each FEC. BFD control packets are transmitted by the ingress LSR, these packet travel along the same data path as the LSP being verified and are processed at the egress LSR. BFD control packets contain a "discriminator" field to distinguish each BFD session on the LSP.

The process of establishing a BFD session (i.e., sending the session parameters from the ingress to the egress LSR) is called BFD session bootstrapping.

One mechanism to bootstrap a BFD session is to use MPLS LSP ping. Specifically, an LSP Ping echo message is sent by an ingress LSR toward the egress LSRs along the data path taken by LSP. The LSP Ping echo message contains the discriminator assigned by the ingress LSR.

Upon receiving the LSP Ping message, an egress LSR sends a BFD control packet to the ingress LSR. A "your discriminator" field in the BFD control packet is set to the discriminator received in LSP Ping echo message. Similar discriminator information is exchanged from the egress LSR to the ingress LSR.

A BFD control packet sent by the ingress LSR to the egress LSRs has the "your discriminator" field set to the discriminator received from the egress LSR. The egress LSR, on receiving the BFD control packet from the ingress LSR, uses the "your discriminator" field value to demultiplex the BFD session.

Unfortunately, this method is not efficient and scalable for P2MP tunnels, since the head of the tunnel (i.e., the root node) must maintain a unique BFD session for each tail of the tunnel (i.e., each leaf node).

A proposed BFD session bootstrapping mechanism for multipoint networks provides that a BFD session originates at the head of the multipoint tree, and the tails need not sent any BFD packets. That is, the root or head node of the MDT assigns a discriminator value bound to the multipoint tree, and transmits a BFD control packet associated with that discriminator. The tail or leaf nodes of the MDT demultiplex received packets based on a combination of the packet source address (i.e., the IP address of the source or receiving node) and the assigned discriminator which together uniquely identify the head node of the MDT as well as the point to multipoint tunnel structure represented by the MDT. Internet Engineering Task Force (IETF) proposed standard entitled "BFD for Multipoint Networks" by D. Katz and D. Ward (Feb. 5, 2009).

Unfortunately, the proposed BFD session bootstrapping mechanism does not address the specific discriminator values to be used, and does not define how the BFD session discriminator values are to be propagated from the BFD head to BFD tails. It is noted that BFD sessions are independent of any MVPN or P2MP configuration.

BRIEF SUMMARY

Various deficiencies of the prior art are addressed by the present invention of a method for detecting faults associated with a tunnel delivering multicast traffic from a source provider edge router (PE) to each of a plurality of destination PEs, the method using a routing protocol such as BGP to communicate route information to destination PEs, and a fault detection protocol such as BFD to detect tunnel faults.

One embodiment comprises a method for detecting faults associated with a tunnel delivering multicast traffic from a source provider edge router (PE) to each of a plurality of destination PEs, the method comprising at the source PE, transmitting toward each destination PE information identifying the source PE and the tunnel delivering multicast traffic to the destination PE; establishing a Bidirectional Forwarding Detection (BFD) session between the source PE and the destination PEs; using the transmitted information as a BFD session discriminator to associate the BFD session with the tunnel; and defining data plane faults detected by a BFD session as faults of an associated tunnel. BFD control packets may be rejected by destination PEs when associated with other BFD sessions or session tails.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of a specific out of band signaling mechanism (i.e., BGP) adapted to propagate BFD session discriminator values within the context of a Point to Multipoint (P2MP) tunnel. However, those skilled in the art and informed by the teachings herein will realize that the invention is also applicable to the propagation of session discriminator values via other out of band signaling mechanisms, the propagation of non-BFD session discriminator values and or equivalents thereof, and various combinations as discussed herein.

Generally speaking, various embodiments provide that nodes receiving BFD control packets (or non-BFD control packets) respond only to those control packets associated with the appropriate root node of the P2MP tunnel.

Figure 1:
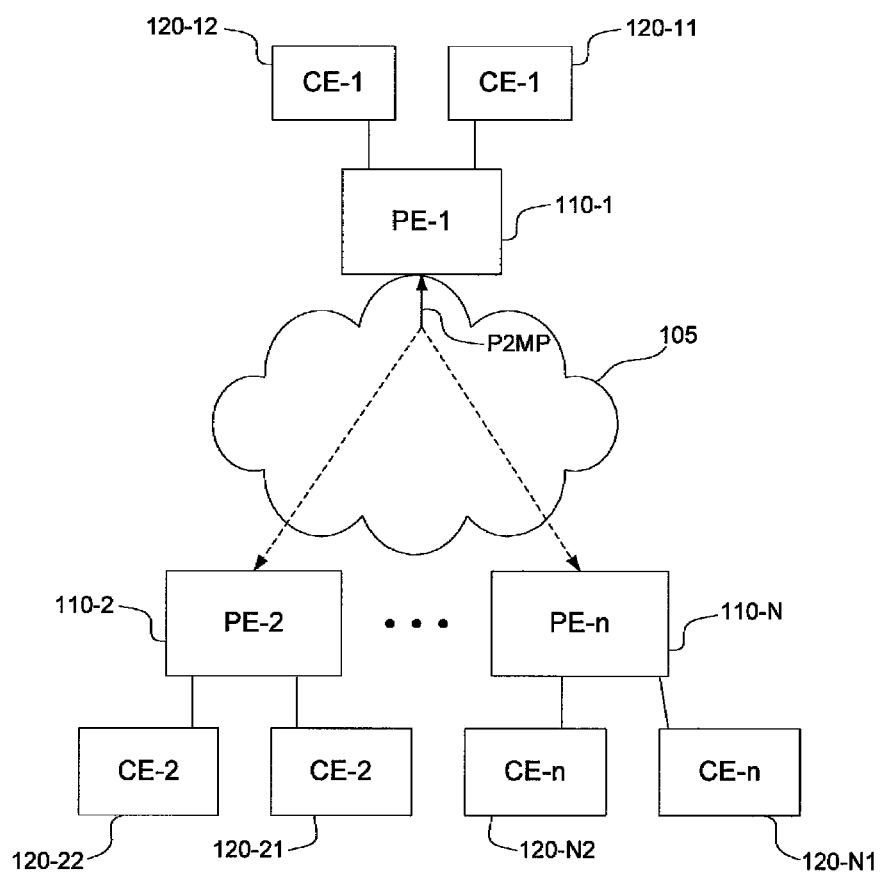
FIG. 1 depicts a high-level block diagram of a plurality of interconnected network elements according to one embodiment.

FIG. 1 depicts a high-level block diagram of a plurality of interconnected network elements according to one embodiment. Specifically, FIG. 1 depicts a plurality of provider edge (PE) routers denoted as PE routers 110-1 through 110-N (collectively PE routers 110) capable of communicating with each other via a network 105, illustratively a Multi-Protocol Label Switched (MPLS) network supporting Label Switched Paths (LSPs). Each of the PE routers 110 communicates with a respective group of customer edge (CE) routers 120. For illustrative purposes, a first PE router 110-1 is depicted as communicating with a respective first CE router 120-11 and a respective second CE router 120-12; a second PE router 110-2 is depicted as communicating with a respective first CE router 120-21 and a respective second CE router 120-22; and an $N^{th}$ CE router 120-N is depicted as communicating with a respective first CE router 120-N1 and a respective second CE router 120-N2.

FIG. 1 depicts, illustratively, two Multicast Virtual Private Networks (MVPNs) operative to route data from a source PE router (first PE router 120-1) to each of a plurality of destination PE routers (second 120-2 through Nth 120-N PE routers). Specifically, each of the first CE nodes 120-x1 (120-11, 120-21 through 120-N1) is connected by a first MVPN, while each of the second CE nodes 120-x2 (120-12, 120-22 through 120-N2) is connected by a second MVPN. For each of the first and second MVPNs, there is a P2MP tunnel from each PE router connected to an included CE node to the other PE routers connected to an included CE node.

In one embodiment, Border Gateway Protocol (BGP) is used to exchange intra-AutoDiscovery Provider Multicast Service Interface (intra-AD PMSI) route data between the PE routers to exchange thereby information about the P2MP tunnel. The intra-AD PMSI route contains information to identify the head of P2MP tunnel and the tunnel identifier. Other protocols may also be used to exchange this type of information. The P2MP tunnel is used to carry multicast traffic from the source PE to all receiver PEs.

In one embodiment, bidirectional forwarding detection (BFD) is used to detect data plane problems associated with the P2MP tunnel. Other fault detection protocols may also be used to detect data plane problems.

Figure 2:
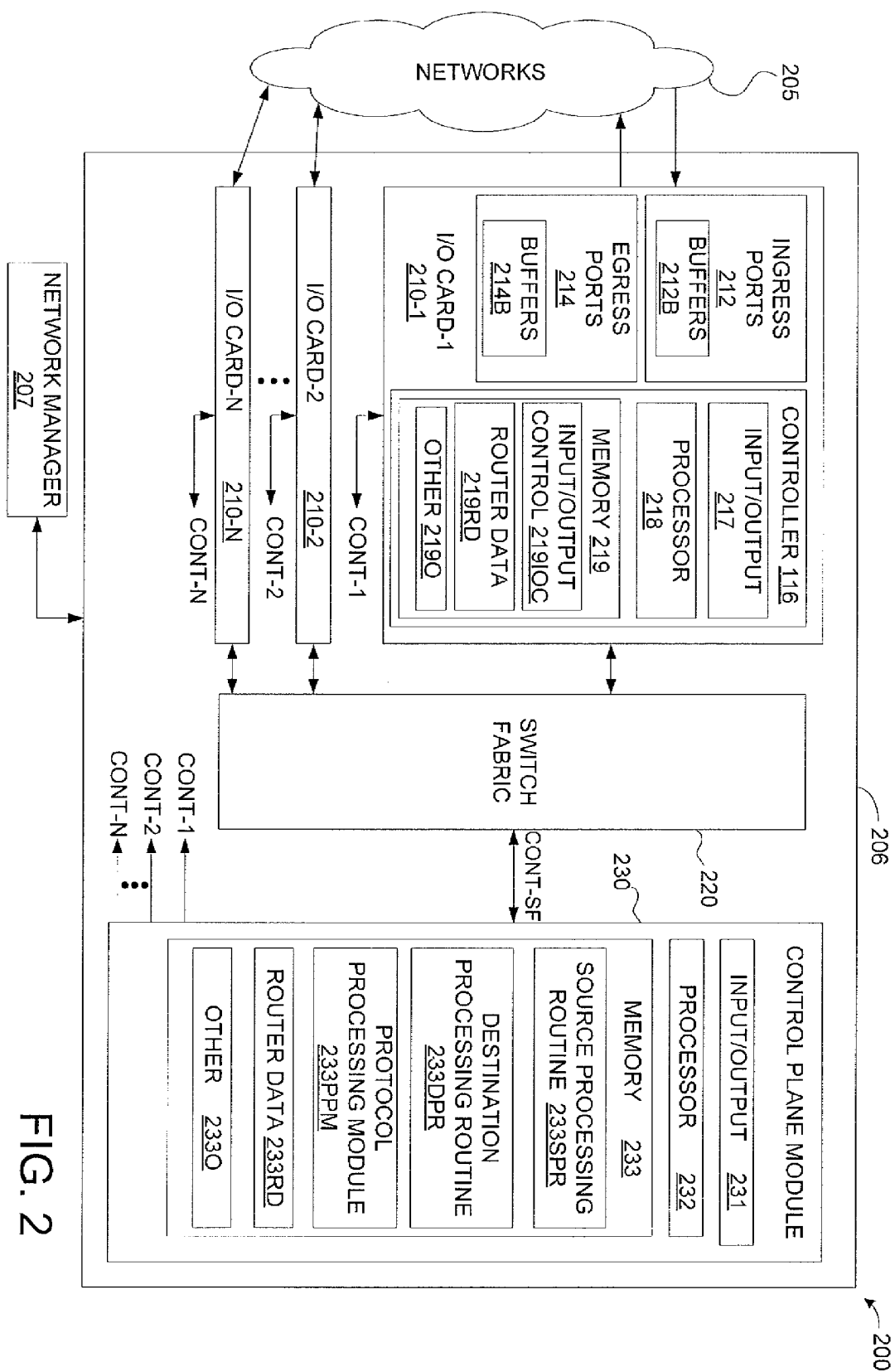
FIG. 2 depicts a router suitable for use in the embodiments of FIG. 1.

FIG. 2 depicts a router suitable for use in the embodiments of FIG. 1. Specifically, FIG. 2 depicts a router 206 in communication with one or more networks 205 and a network manager 207. The router 206 may be used to implement any of the PE routers 110 or CE routers 120 discussed above with respect to FIG. 1

The router 206 includes a plurality of input output (I/O) cards 210-1, 210-2 and so on up to 210-N (collectively I/O cards 210), a switch fabric 220 and a control plane module 230. The control plane module 230 controls the operation of the I/O cards 210 and switch fabric 220 by respective control signals CONT.

Each of the I/O cards 210 includes a plurality of ingress ports 212 including corresponding ingress ports buffers 212B, a plurality of egress ports 214 including corresponding egress port buffers 214B, and a controller 216 including an I/O module 217, a processor 218 and memory 219. The memory 219 is depicted as including software modules, instantiated objects and the like to provide input/output control functions 219IOC, router data 219RD and other functions 219O. The controller 216 may be implemented as a general purpose computing device or specific purpose computing device, such as described below with respect to FIG. 5.

The I/O cards 210 operate to convey packets between the network(s) 205 and the switch fabric 220. Packets received at a particular ingress port 212 of an I/O card 210 may be conveyed to the switch fabric 220 or back to the network(s) 205 via a particular egress port 212 of the I/O cards 210. Routing of packets via the I/O cards 210 is accomplished in a standard manner according to routing data provided by the control plane module 230, which may be stored in the router data portion 219RD of memory 219.

The switch fabric 220 may comprise any standard switch fabric such as electrical, optical, electro-optical, MEMS and the like.

The control plane module 230 receives from a network manager 207 configuration data, routing data, policy information, and/or other information pertaining to various management functions. The control plane module 230 provides management and operations data to the network manager 207, including data such as configuration data, status data, alarm data, performance data and the like.

The control plane module 230 comprises an I/O module 231, a processor 232 and memory 233. The memory 233 is depicted as including software modules, instantiated objects and the like to provide a source processing routine 233SPR, a destination processing routine 233DPR, a protocol processing module 233PPM, router data 233RD and other functions 233O. The control plane module 230 may be implemented as a general purpose computing device or specific purpose computing device, such as described below with respect to FIG. 5.

The source processing routine 233SPR operates to perform various functions supporting the operation of router 206 when implementing source, root or ingress routing functions associated with a PE router 110 or CE router 120 as described herein with respect to the various figures.

The destination processing routine 233DPR operates to perform various functions supporting the operation of router 206 when implementing destination, leaf or egress routing functions associated with a PE router 110 or CE router 120 as described herein with respect to the various figures.

The router data 233RD operates to process routing information such that packets or traffic flows received at ingress ports are routed to appropriate egress ports within the context of the router 206. The router data 233RD may include routing tables, protection or fault recovery information and so on.

Figure 3:
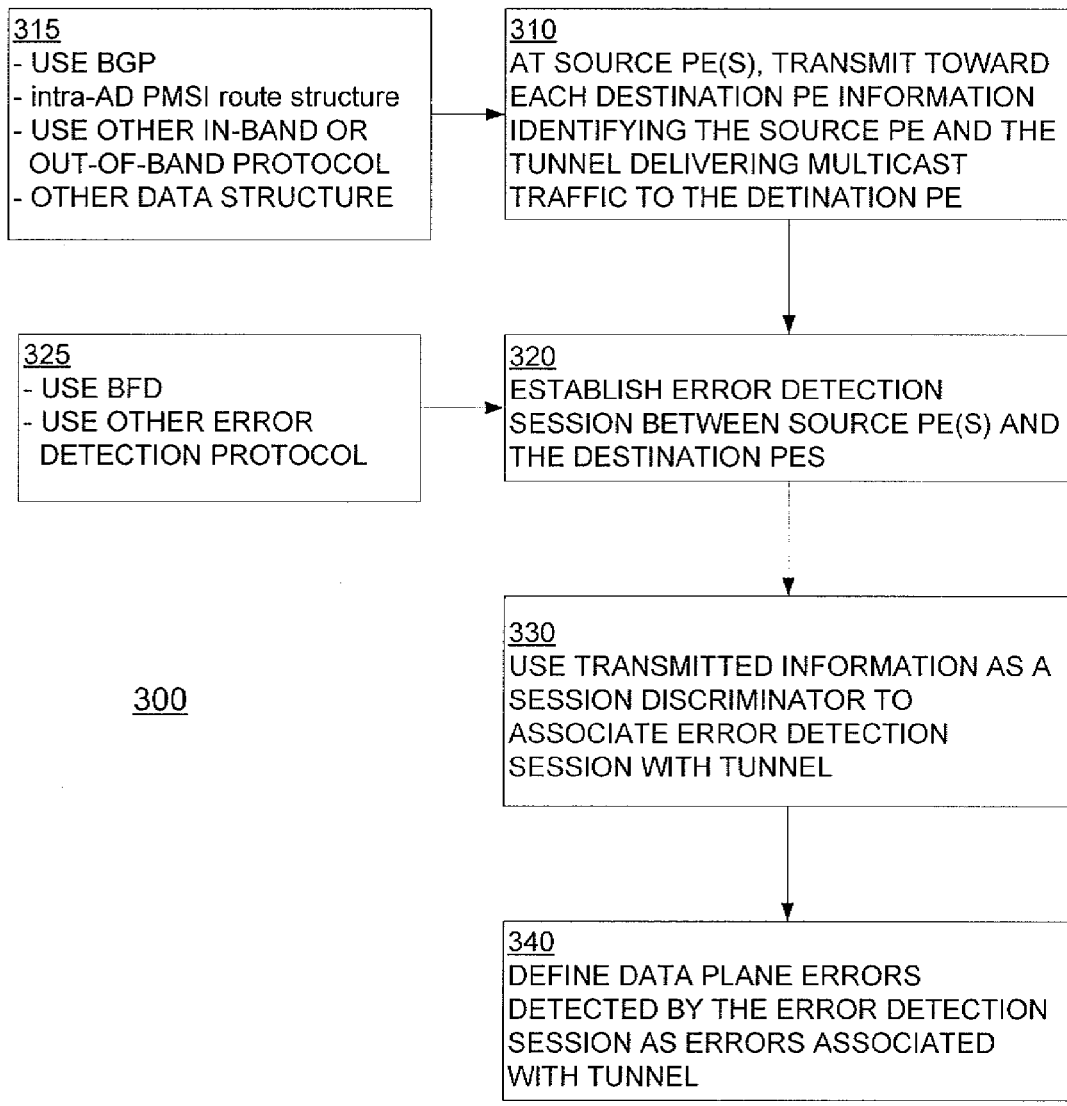
FIG. 3 depicts a flow diagram of a method for detecting faults according to one embodiment.

FIG. 3 depicts a flow diagram of a method for detecting faults according to one embodiment and suitable for use within the context of the plurality of interconnected network elements described above with respect FIG. 1. Generally speaking, the method 300 of FIG. 3 contemplates a point to multipoint tunnel wherein Border Gateway Protocol (BGP) is used to exchange route information among the various PE routers, while bidirectional forwarding detection (BFD) is used to detect data plane faults, which data plane faults are associated with the underlying tunnel.

At step 310, at each of one or more tunnel source PEs, information is transmitted toward one or more respective tunnel destination PEs that identifies the source PE and the corresponding P2MP tunnel delivering data to the destination PE. Referring to box 315, Border Gateway Protocol (BGP) may be used to provide (or exchange) this information as part of an intra-AD PMSI route structure transmitted towards (or exchanged between) the source and destination PE routers.

Optionally, other protocols and/or data structures may be used to provide or exchange such information between source and destination PE routers. For example, while the various embodiments are primarily described within the context of using BGP for exchanging MVPN routes, other embodiments use static configuration at PE routers to form the P2MP tunnel (for MDT) without using BGP to exchange information. Moreover, in various embodiments the BGP MPVN route is extended to include BFD session parameters either as optional values in an existing intra-AD PMSI route, or as a new route type.

At step 320, a fault detection session is established between each of one or more of source PEs and one or more respective destination PEs. Referring to box 325, the fault detection session may comprise a bidirectional forwarding detection (BFD) or other fault detection session or mechanism, such as MPLS ping, LSP (Label Switched Path) ping or CFM (connectivity fault management).

At step 330, the information transmitted to each destination PE is used as a session discriminator by that destination PE to associate its fault detection session with the P2MP tunnel delivering data to the destination PE. Referring to box 335, if the fault detection session comprises a BFD fault detection session, then the session discriminator comprises a BFD session discriminator.

At step 340, data plane faults detected via a fault detection session between a source PE and corresponding destination PE are defined as faults in the P2MP tunnel delivering data from the source PE to the destination PE (and responded to accordingly). That is, data plane faults detected via a fault detection session such as a BFD fault detection session are attributed to the P2MP tunnel between the source PE and destination PE associated with that fault detection session. In this manner, the rapid (e.g., sub-second, up to approximately 30 ms) fault detection capabilities associated with a fault detection session are used to quickly identify faults associated with the underlying P2MP tunnel delivering data from the source PE to the destination PE.

Figure 4:
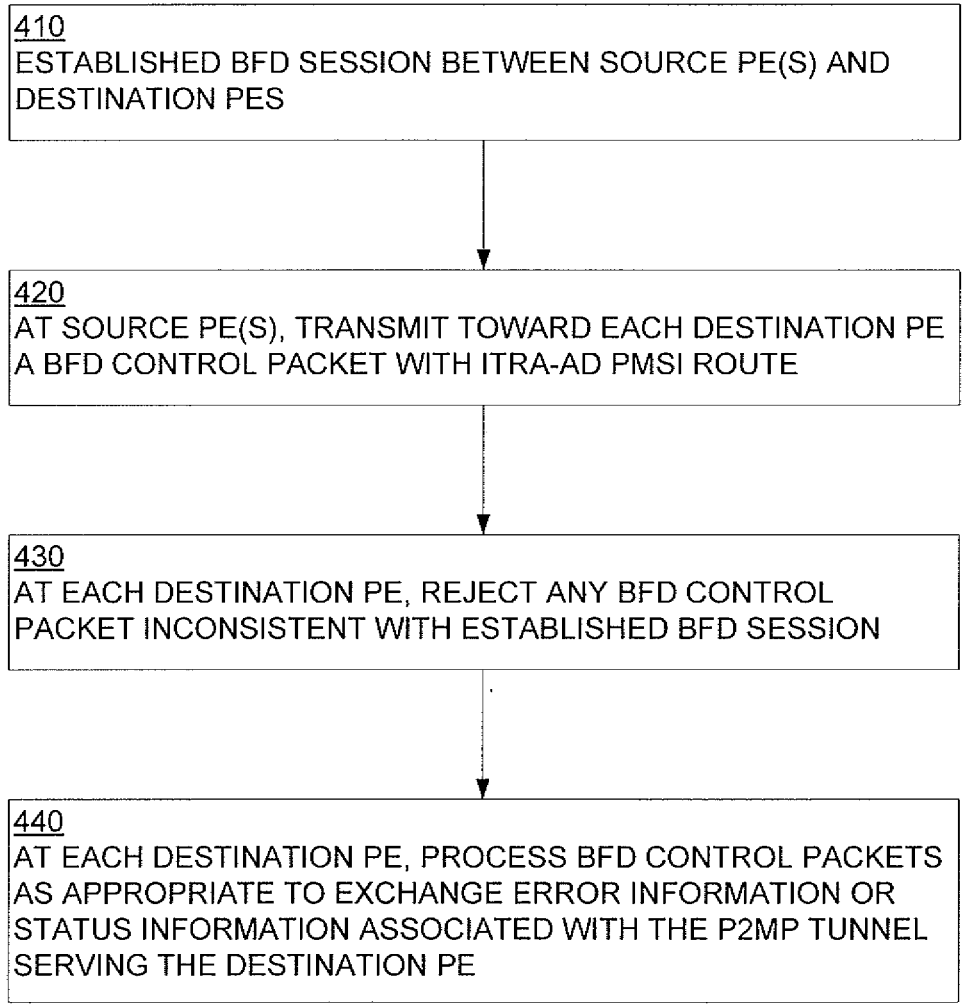
FIG. 4 depicts a flow diagram of a method for processing BFD control packets in accordance with various embodiments.

FIG. 4 depicts a flow diagram of a method for processing BFD control packets in accordance with various embodiments. Within the context of a BFD protocol embodiment, the P2MP root (PE-1) is the head of the BFD session, while other leaf PEs are the tails of the BFD session.

At step 410, a BFD session is established between the source PE(s) and the destination PEs.

At step 420, each of the one or more source PE(s) transmits toward each destination PE a BFD control packet with an intra-AD PMSI route, which is used to derive BFD session parameters from the intra-AD PMSI route which includes P2MP tunnel information. Derived information such as the 'source address' and the 'my discriminator' values may be used to find the correct BFD session.

At step 430, at each destination PE, any BFD control packet that is inconsistent with the established BFD session is rejected. That is, the destination PE will reject any BFD control packet intended for a different BFD session than the session associated with the particular destination PE. For example, the BFD control packet may be rejected due to a mismatch in which a BFD-tail session exists at the destination PE but does not match the session parameters associated with the received BFD control packets. This mechanism operates to guarantee that the P2MP tunnel root PE is the source of the BFD session.

At step 440, those BFD control packets that are not rejected by the destination PE are processed by, illustratively, a BFD protocol processing module or other processing element within the destination PE. For example, the BFD protocol processing module associated with each destination PE may use the P2MP tunnel identifier from the MVPN intra-AD route as a BFD session discriminator.

Generally speaking, within the context of the method 400 of FIG. 4, each destination, receiver and/or egress PE that is associated with a respective BFD session tail operates to reject those BFD control packets associated with a different BFD session or session tail.

The various embodiments discussed herein avoid or reduce the overhead of maintaining discriminator allocation logic in the BFD module. The BFD session parameters are available before the BFD control packets are received at the destination PE and, therefore, the BFD session is established at the earliest. Also there is no overhead or inefficiency of communicating and tracking each destination PE for the BFD session, which helps in scalability.

Within the context of the various embodiments, each destination PE forms a point or tail within a multipoint tail of a single BFD session that is directly associated with the P2MP tunnel. In this manner, there is no need to maintain discriminator allocation logic or otherwise adapt to multiple BFD sessions, such as between the source PE and each respective destination PE. Further, the use of a single BFD session such as described herein enables tight coupling and control between the MVPN P2MP configuration and the P2MP tunnel state. This type of coupling enables rapid dissemination of fault alerts, fault warnings, status messages and the like.

In various embodiments described herein, an intra-AD PMSI route structure or type is described. It is noted that the various embodiments may use the intra-AD PMSI route type or various sub-types of the intra-AD PMSI route type, such as intra-AD Inclusive-PMSI (intra-AD I-PMSI) or intra-AD Selective-PMSI (intra-AD S-PMSI) route types. Various other embodiments contemplate the use of intra-Autonomous System PMSI AutoDiscovery (intra-AS PMSI AD), intra-AS I-PMSI AD and intra-AS S-PMSI AD route types, as well as combinations thereof.

Various embodiments advantageously allow the BFD session at the multipoint tail to be directly associated with the P2MP tunnel. In particular, the BGP protocol is used to exchange MVPN route information (or other route information) between PE routers. In various embodiments, when the MVPN uses MPLS as transport layer, then the P2MP tunnel information is also included in the PMSI route. The tunnel data includes information about the root of the tunnel (i.e., the source or ingress PE address), the tunnel identifier and/or other information.

Methodologies described herein include a method for establishing a BFD session over P2MP. The specific fault detection mechanism used by the BFD session is defined within the context of the BFD protocol. The methods of the various embodiments that use the BFD session for fault detection implicitly derive the BFD session discriminator without use of MPLS OAM or equivalent mechanisms to convey the discriminator to the BFD-tail.

Figure 5:
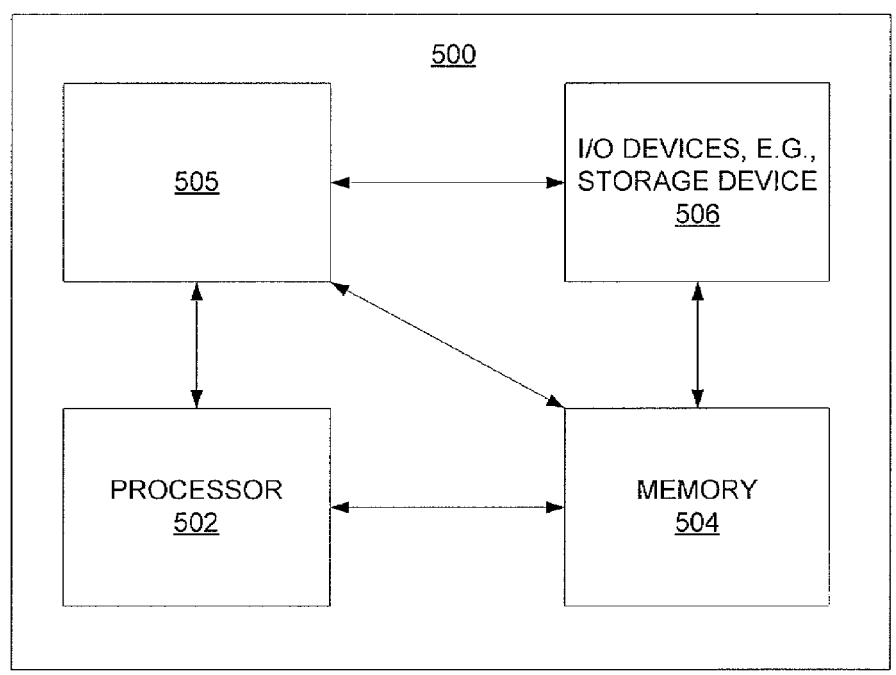
FIG. 5 depicts a high-level block diagram of a general purpose computer suitable for use in performing the functions described herein.

FIG. 5 depicts a high-level block diagram of a general purpose computer suitable for use in performing the functions described herein. As depicted in FIG. 5, system 500 comprises a processor element 502 (e.g., a CPU), a memory 504, e.g., random access memory (RAM) and/or read only memory (ROM), a packet processing module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It will be appreciated that computer 500 depicted in FIG. 5 provides a general architecture and functionality suitable for implementing functional elements described herein and/or portions of functional elements described herein. Functions depicted and described herein may be implemented in software and/or hardware, e.g., using a general purpose computer, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, transmitted via tangible media and/or stored within a memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for detecting faults associated with a tunnel delivering multicast traffic from a source provider edge (PE) to each of a plurality of destination PEs, the method comprising:
    transmitting, from the source PE toward each destination PE via a routing protocol, information identifying the source PE and the tunnel delivering multicast traffic to the destination PEs;
    establishing a Bidirectional Forwarding Detection (BFD) session between the source PE and the destination PEs;
    using the transmitted information as a BFD session discriminator at one of the destination PEs to associate the BFD session with the tunnel at the one of the destination PEs; and
    defining data plane faults detected by the BFD session as faults of the tunnel.

2. The method of claim 1, wherein the tunnel comprises a Multicast Virtual Private Network (MVPN).

3. The method of claim 2, wherein the transmitted information comprises an intra-AutoDiscovery Provider Multicast Service Interface (intra-AD PMSI) route transmitted according to Border Gateway Protocol (BGP).

4. The method of claim 2, wherein the transmitted information comprises an intra-AutoDiscovery Inclusive Provider Multicast Service Interface (intra-AD I-PMSI) route transmitted according to Border Gateway Protocol (BGP).

5. The method of claim 2, wherein the MVPN uses Multi-Protocol Label Switching (MPLS) as a transport layer.

6. The method of claim 5, wherein the BFD session discriminator comprises a P2MP tunnel identifier of an MVPN intra-AD route.

7. The method of claim 1, further comprising:
    transmitting a BFD control packet including information adapted to derive therefrom BFD session parameters.

8. The method of claim 7, wherein each destination PE that is a tail of the BFD session derives BFD session parameters associated with the BFD control packet.

9. The method of claim 7, wherein each destination PE rejects the BFD control packet based on a determination that the derived BFD session parameters to not match the BFD session discriminator.

10. The method of claim 1, wherein Border Gateway Protocol (BGP) is used to exchange route information between PE routers.

11. The method of claim 1, wherein the tunnel delivers multicast traffic from a customer edge router (CE) associated with the source PE to at least one CE associated with at least one of the plurality of destination PEs.

12. The method of claim 1, wherein a Multicast Distribution Tree (MDT) is used to connect source and destination CEs.

13. A method for detecting faults associated with a tunnel delivering multicast traffic from a source provider edge (PE) to each of a plurality of destination PEs, the method comprising:
    receiving, at one of the destination PEs via a routing protocol, a set of parameters identifying the source PE and the tunnel; and
    using, at the one of the destination PEs, the set of parameters as a session discriminator for a fault detection session between the source PE and the one of the destination PEs.

14. The method of claim 13, wherein the fault detection session comprises a Bidirectional Forwarding Detection (BFD) session.

15. The method of claim 13, wherein the routing protocol comprises Border Gateway Protocol (BGP).

16. The method of claim 15, wherein the set of parameters is received as part of an intra-AutoDiscovery Provider Multicast Service Interface (intra-AD PMSI) route.

17. The method of claim 14, further comprising:
    receiving a BFD control packet at the one of the destination PEs;
    deriving a set of BFD session parameters based on the BFD control packet; and
    comparing the derived set of BFD session parameters with the session discriminator for determining whether to accept or reject the BFD control packet.

18. The method of claim 13, wherein the set of parameters is received as part of an intra-AutoDiscovery Provider Multicast Service Interface (intra-AD PMSI) route.

19. A non-transitory computer-readable storage medium including software instructions which, when executed by a processor, cause the processor to perform a method for detecting faults associated with a tunnel delivering multicast traffic from a source provider edge (PE) to each of a plurality of destination PEs, the method comprising:
    transmitting, from the source PE toward each destination PE via a routing protocol, information identifying the source PE and the tunnel delivering multicast traffic to the destination PEs;

establishing a Bidirectional Forwarding Detection (BFD) session between the source PE and the destination PEs;

using the transmitted information as a BFD session discriminator at one of the destination PEs to associate the BFD session with the tunnel at the one of the destination PEs; and defining data plane faults detected by the BFD session as faults of the tunnel.

20. A computer program product, wherein a computer is operative to process software instructions which adapt the operation of the computer such that the computer performs a method for detecting faults associated with a tunnel delivering multicast traffic from a source provider edge (PE) to each of a plurality of destination PEs, the method comprising:

transmitting, from the source PE toward each destination PE via a routing protocol, information identifying the source PE and the tunnel delivering multicast traffic to the destination PEs;

establishing a Bidirectional Forwarding Detection (BFD) session between the source PE and the destination PEs;

using the transmitted information as a BFD session discriminator at one of the destination PEs to associate the BFD session with the tunnel at the one of the destination PEs; and defining data plane faults detected by the BFD session as faults of the tunnel.

* * * * *